(12) United States Patent
Valenti et al.

(10) Patent No.: US 12,015,598 B2
(45) Date of Patent: Jun. 18, 2024

(54) METHOD AND APPARATUS TO ENABLE A MARKET IN USED DIGITAL CONTENT

(71) Applicant: INTEGIC TECHNOLOGIES LLC, Wilmington, DE (US)

(72) Inventors: William L. Valenti, Seattle, WA (US); Edward P. Flinchem, Seattle, WA (US)

(73) Assignee: Integic Technologies LLC, Wilmington, DE (US)

( * ) Notice: Subject to any disclaimer, the term of this patent is extended or adjusted under 35 U.S.C. 154(b) by 2 days.

(21) Appl. No.: 17/883,352

(22) Filed: Aug. 8, 2022

(65) Prior Publication Data

US 2022/0376912 A1    Nov. 24, 2022

Related U.S. Application Data

(60) Division of application No. 15/650,489, filed on Jul. 14, 2017, now Pat. No. 11,411,931, which is a
(Continued)

(51) Int. Cl.
*H04L 9/40* (2022.01)
*G06F 21/10* (2013.01)
(Continued)

(52) U.S. Cl.
CPC .......... *H04L 63/0428* (2013.01); *G06F 21/10* (2013.01); *G06F 21/35* (2013.01);
(Continued)

(58) Field of Classification Search
CPC . H04L 63/0428; H04L 9/0869; H04L 9/0891; H04L 9/14; H04L 2209/56;
(Continued)

(56) References Cited

U.S. PATENT DOCUMENTS

| 4,823,388 A | 4/1989 | Mizutani et al. |
| 5,784,463 A * | 7/1998 | Chen .......... H04L 9/40 713/156 |

(Continued)

OTHER PUBLICATIONS

The International Preliminary Report on Patentability for PCT/US2005/043142 issued on Jun. 5, 2007.
(Continued)

*Primary Examiner* — Patrick Mcatee
*Assistant Examiner* — Nakia Leffall-Allen
(74) *Attorney, Agent, or Firm* — Foley & Lardner LLP

(57) ABSTRACT

Methods and apparatus to enable a distinction between "new" and "used" digital content and to enable a market in used digital content files between mobile phone terminals and an electronic store, securely, by means of a wireless telephony network and a server complex to handle contents right management, transaction reporting, inventory, content delivery, payment, and billing. A server receives a signal generated by a wireless user device that was sent over a wireless telephony network. The signal indicates an election for returning at least one previously purchased digital content item. The server deletes user rights for the at least one digital content item identified by the received signal and sends information to the user device that generated the signal. Access to the associated digital content item at the user device is removed according to the sent information.

12 Claims, 5 Drawing Sheets

Related U.S. Application Data continuation of application No. 11/285,781, filed on Nov. 21, 2005, now abandoned.

(60) Provisional application No. 60/631,704, filed on Nov. 30, 2004.

(51) Int. Cl.
*G06F 21/35* (2013.01)
*H04L 9/08* (2006.01)
*H04L 9/14* (2006.01)

(52) U.S. Cl.
CPC .......... *H04L 9/0869* (2013.01); *H04L 9/0891* (2013.01); *H04L 9/14* (2013.01); *G06F 2221/2135* (2013.01); *H04L 2209/56* (2013.01); *H04L 2209/603* (2013.01); *H04L 2463/062* (2013.01); *H04L 2463/081* (2013.01)

(58) Field of Classification Search
CPC ......... H04L 2209/603; H04L 2463/062; H04L 2463/081; G06F 21/10; G06F 21/35; G06F 2221/2135
See application file for complete search history.

(56) References Cited

U.S. PATENT DOCUMENTS

| | | | |
|---|---|---|---|
| 6,085,168 A | 7/2000 | Mori et al. | |
| 6,226,618 B1* | 5/2001 | Downs | H04L 9/0822 380/282 |
| 6,424,845 B1* | 7/2002 | Emmoft | G07F 7/0873 455/575.1 |
| 6,983,381 B2* | 1/2006 | Jerdonek | H04L 63/0272 726/5 |
| 6,996,563 B2 | 2/2006 | Kumagai et al. | |
| 7,031,469 B2 | 4/2006 | Srinivasan et al. | |
| 7,289,273 B2* | 10/2007 | Mihara | G02B 15/143507 359/716 |
| 7,389,273 B2 | 6/2008 | Irwin et al. | |
| 2002/0077986 A1 | 6/2002 | Kobata et al. | |
| 2002/0138291 A1 | 9/2002 | Vaidyanathan et al. | |
| 2003/0004882 A1 | 1/2003 | Holler et al. | |
| 2004/0054632 A1 | 3/2004 | Remy | |
| 2005/0005000 A1 | 1/2005 | Yoshimoto | |
| 2005/0049973 A1* | 3/2005 | Read | G06F 21/10 705/59 |
| 2005/0091069 A1* | 4/2005 | Chuang | G06Q 30/0207 705/14.1 |
| 2005/0113067 A1 | 5/2005 | Marcovici et al. | |
| 2005/0154909 A1 | 7/2005 | Zhang et al. | |
| 2005/0240533 A1* | 10/2005 | Cutter | G06F 21/105 705/59 |
| 2005/0279826 A1* | 12/2005 | Merrien | G06Q 20/341 235/380 |
| 2005/0281540 A1 | 12/2005 | Inokuchi | |
| 2006/0031164 A1 | 2/2006 | Kim | |
| 2006/0069652 A1 | 3/2006 | Ebihara et al. | |
| 2006/0080257 A1 | 4/2006 | Vaughn et al. | |
| 2010/0332401 A1 | 12/2010 | Prahlad et al. | |

OTHER PUBLICATIONS

The International Search Report and Written Opinion for PCT/US2005/43142 mailed on Aug. 18, 2006.
Microsoft Press, Microsoft Computer Dictionary, Fifth Edition, Published 2002, p. 159.

* cited by examiner

METHOD AND APPARATUS TO ENABLE A MARKET IN USED DIGITAL CONTENT

CROSS-REFERENCE TO RELATED APPLICATIONS

This application is a divisional application of U.S. patent application Ser. No. 15/650,489, filed Jul. 14, 2017, now patent Ser. No. 11/411,931, which is a continuation of U.S. patent application Ser. No. 11/285,781, filed Nov. 21, 2005, which claims priority to U.S. Provisional Application No. 60/631,704, filed Nov. 30, 2004, all of which are incorporated by reference in their entireties.

BACKGROUND OF THE INVENTION

Digital content, such as music, games and video, are becoming more and more central to the world economy. The transaction of digital content is a general transfer of data and data communications over a network, such as the Internet.

With regard to the rights to use the digital content, the prior art takes a defensive posture that is focused on guarding the digital content against unauthorized access, duplication and use. Limitations are placed on the use and distribution of a piece of digital content, and various means are used to attempt to enforce these limitations. Oftentimes, the limitations can be easily circumvented, and so enforcement can be difficult and therefore is mostly ineffective.

Present methods for attaining rights to use a piece of digital content are focused on resolving digital rights issues as they pertain to digital content delivery between an end desktop computer and a controlling server. Little has been done to generate a digital rights management system that operates at least in part over a data telephony network.

Therefore, there exists a need to provide a secured digital content data transmission system that allows recipients some secure control over transmission of digital content.

BRIEF SUMMARY OF THE INVENTION

The present invention provides methods and apparatus to enable a distinction between "new" and "used" digital content and to enable a market in used digital content files between mobile phone terminals and an electronic store, securely, by means of a wireless telephony network and a server complex to handle contents right management, transaction reporting, inventory, content delivery, payment, and billing.

In one embodiment, a method for deleting rights to one or more digital content items at a wireless user device in a digital rights management environment is provided. A server receives a signal generated by a wireless user device that was sent over a wireless telephony network. The signal indicates an election for returning at least one previously purchased digital content item. The server deletes user rights for the at least one digital content item identified by the received signal and sends information to the user device that generated the signal. Access to the associated digital content item at the user device is removed according to the sent information.

In another embodiment, the server generates a new digital key and encrypts the new digital key, a previously generated random number, and an id string associated with the user device using a digital key previously confirmed by use of at least two distinct networks. The server also determines the digital content items the user has user rights for and encrypts one or more digital content keys associated using the new digital key based on the determination. The encrypted new digital key and the encrypted one or more digital content keys are sent to the user device.

BRIEF DESCRIPTION OF THE SEVERAL VIEWS OF THE DRAWING

The preferred and alternative embodiments of the present invention are described in detail below with reference to the following drawings.

DETAILED DESCRIPTION OF THE INVENTION

Methods and apparatus to enable a distinction between "new" and "used" digital content and to enable a market in used digital content files between mobile phone terminals and an electronic store, securely, by means of a wireless telephony network and a server complex to handle contents right management, transaction reporting, inventory, content delivery, payment, and billing.

In one embodiment, a mobile phone enables a consumer to engage in a retail transaction to purchase digital content that is downloaded to their phone over the air, such that a copy of the content then resides persistently on their phone for their ongoing use. Any consumer so enabled with a mobile phone may give up their rights to and access to a piece of digital content to which they had previously purchased legitimate rights from an electronic store in exchange for credit or payment. Analogous to the buying and selling of used compact discs (physical media), the electronic buying and selling of used digital content would entail the exchange of a finite supply of unique entities, in this case sequences of digital information, with the following properties: 1) each entity is unique, 2) each entity is in the possession of only one individual or organization at a time, 3) entities may not be copied and then successfully exchanged as if they were originals to gain additional value, 4) only certain authorized organizations may generate new entities (i.e., unauthorized organizations can not generate useful counterfeit entities).

The content being bought and sold may take the form of music, pictures, ring tones, animations, video clips, icons, audio files, text information, multimedia combinations of any number of the previous types, or any other type of content for which a digital format may be defined.

Figure 1:
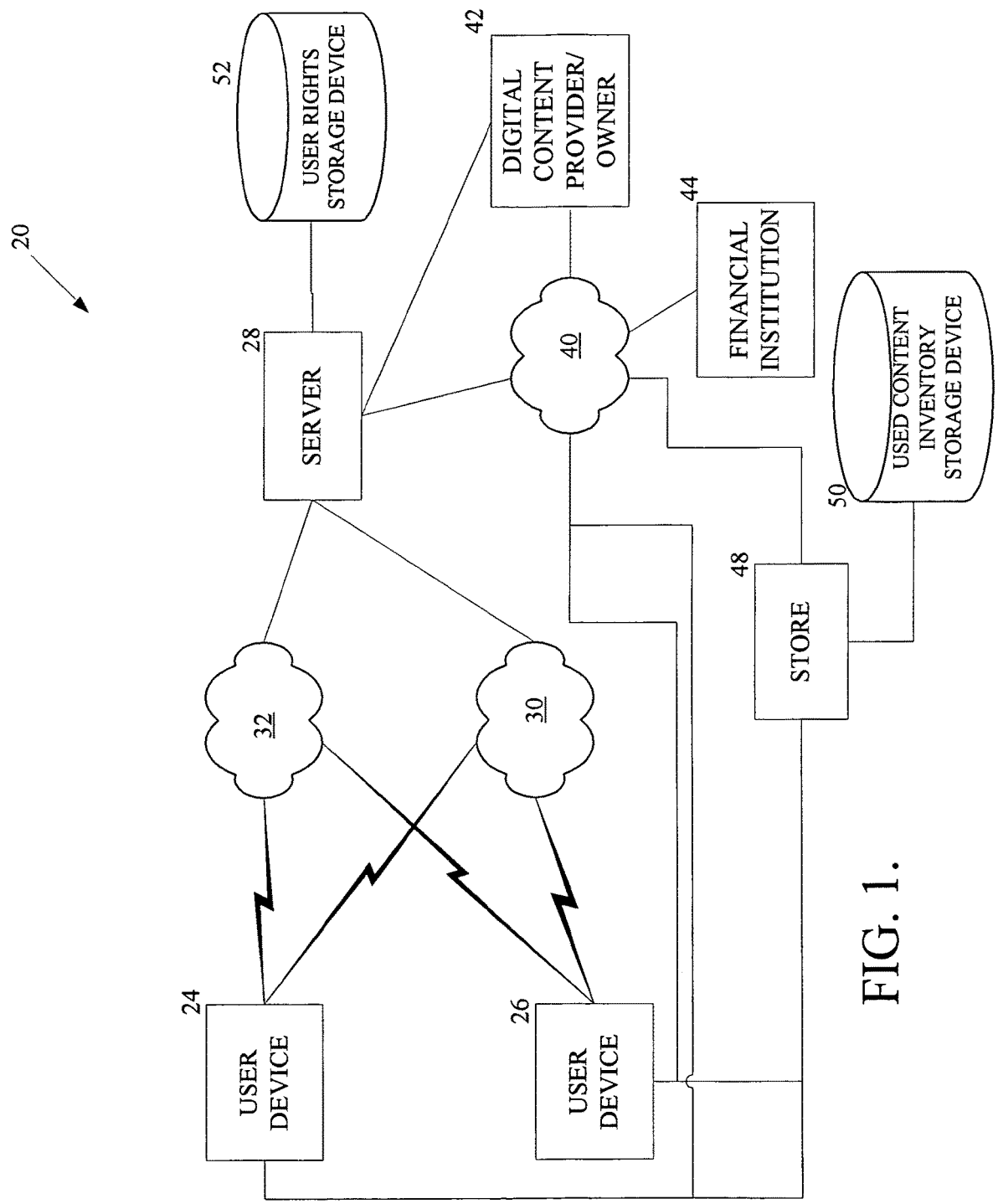
FIG. 1 illustrates a block diagram of an example system formed in accordance with an embodiment of the present invention.

As shown in FIG. 1, a system 20 performs secure transmission of digital content in order to allow for expanded commercial opportunities. The system 20 includes a plurality of user devices 24 and 26 that are in wireless communication with a server 28 via first and second data networks 30 and 32. Examples of the user devices include any of the number of various forms of wireless devices, such as cellular phones, personal data assistance, palmtop or laptop computers, etc. The server 28 is a computer system with local memory that is also directly or indirectly in communication with one of a number of digital content provider/owners 42 and one or more financial institutions 44. In one embodiment, the server 28 is in communication with the digital content provider/owners 42 and the financial institutions 44 over a network 40. A store 48 is in data communication with the user devices 24 and 26 directly or indirectly over any of the networks or via the server 28.

The user devices 24 and 26 use the networks 30 and 32 to separately transmit different data associated with an encryption method to the server 28. The server 28 authenticates each user device 24 and 26 based on the received data and provides each of the user devices 24 and 26 with new secret encryption keys. The new secret encryption keys are used to decrypt digital content requested by the user devices 24 and 26 that are sent from the server 28. The server 28 either directly compensates digital content provider/owner for the sale of associated digital content to the users of the user devices 24 and 26 or provides some other form of compensation (e.g., credit) with the aid of the financial institution 44.

Information pertaining to users' rights to digital content is stored in a users' rights storage unit 52 that is in direct or indirect or indirect data communication with the server 28 or the store 48.

Information pertaining to used digital content is stored in a storage unit 50 that includes an inventory of used digital content or just a record of what digital content has been returned. The storage unit 50 is in direct or indirect or indirect data communication with the server 28 or the store 48. The devices In one embodiment, the networks 30 and 32 are distinct networks from each other, such as a wireless cellular data network and a short message service center (SMSC). The wireless cellular data network may be any one of a general packet radio service (GPRS), Code Division Multiple Access (CDMA), Enhanced Data GSM Environment (EDGE), Universal Mobile Telecommunications System (UMTS), Wideband Code Division Multiple Access (WCDMA), Wireless Fidelity (WIFI), Bluetooth or comparable network. The network 40 is one of a private or public data network, such as the Internet.

Figure 2:
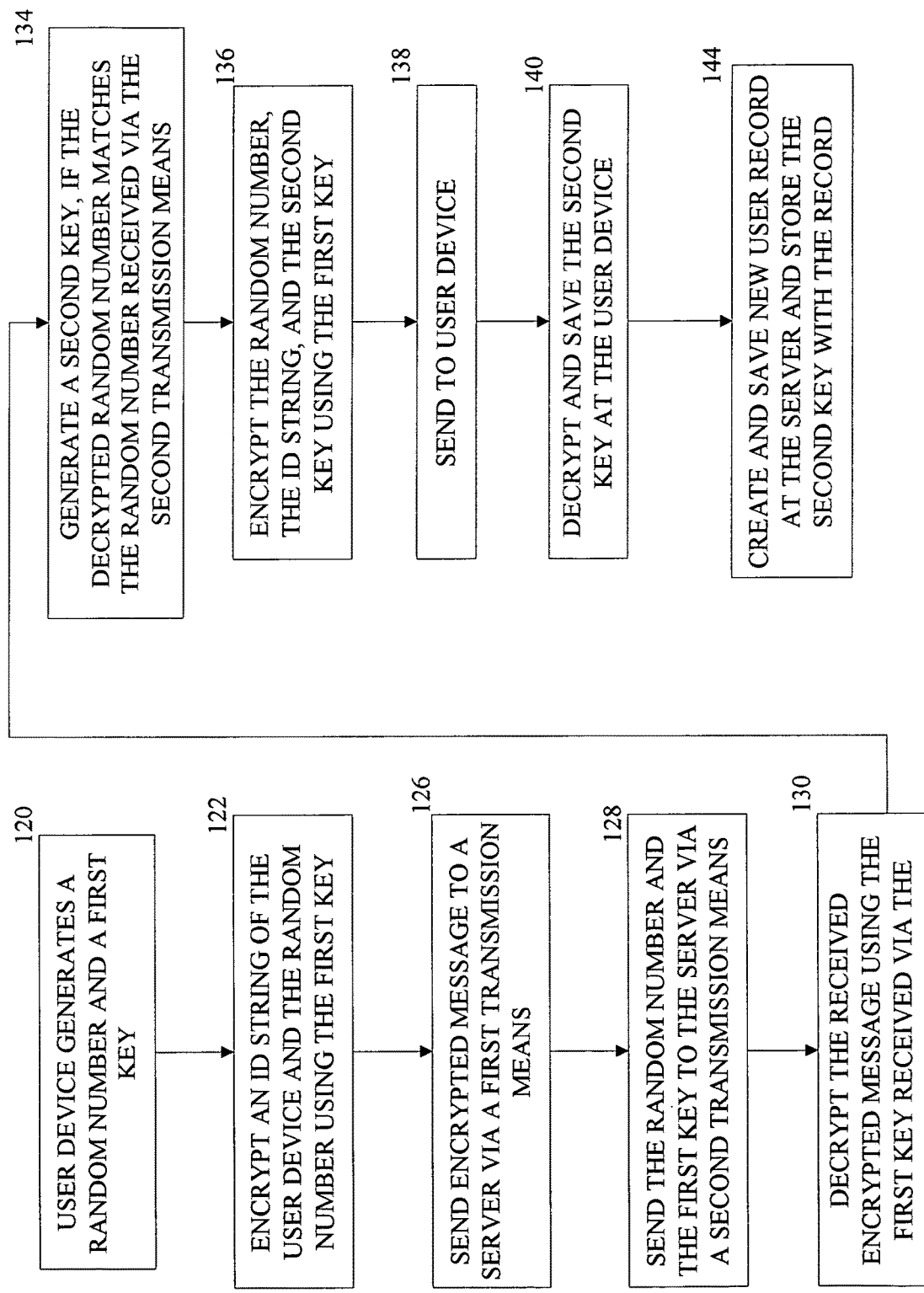
FIG. 2 illustrates an exemplary diagram performed by some of the components shown in FIG. 1 for providing secure access between user devices and a digital rights management system.

In one embodiment, rights are attained according to the following process. As shown in FIG. 2, at a block 120, a user device generates a random number and a first key. At a block 122, the user device encrypts an identification (id) string associated with the user device and the random number using the first key. At a block 126, the encrypted id string and random number are sent to the server via a first transmission means, i.e., a first network 30. At a block 128, the random number and the first key are sent unencrypted to the server 28 via a second transmission means, i.e. the second network 32. Then at a block 130, the server 28 decrypts the received encrypted message using the first key received via the second transmission means. At a block 134, the server 28 generates a second key, if the decrypted random number matches the random number received via the second transmission means. At a block 136, the server 28 encrypts the random number, the id string, and the second key using the first key and at a block 138, sends this new encrypted package to the user device. At a block 140, the user device decrypts the received package using the first key and saves the second key. At a block 144, the server 28 creates and saves a new user record using the id string and stores the second key in the record.

Figure 3:
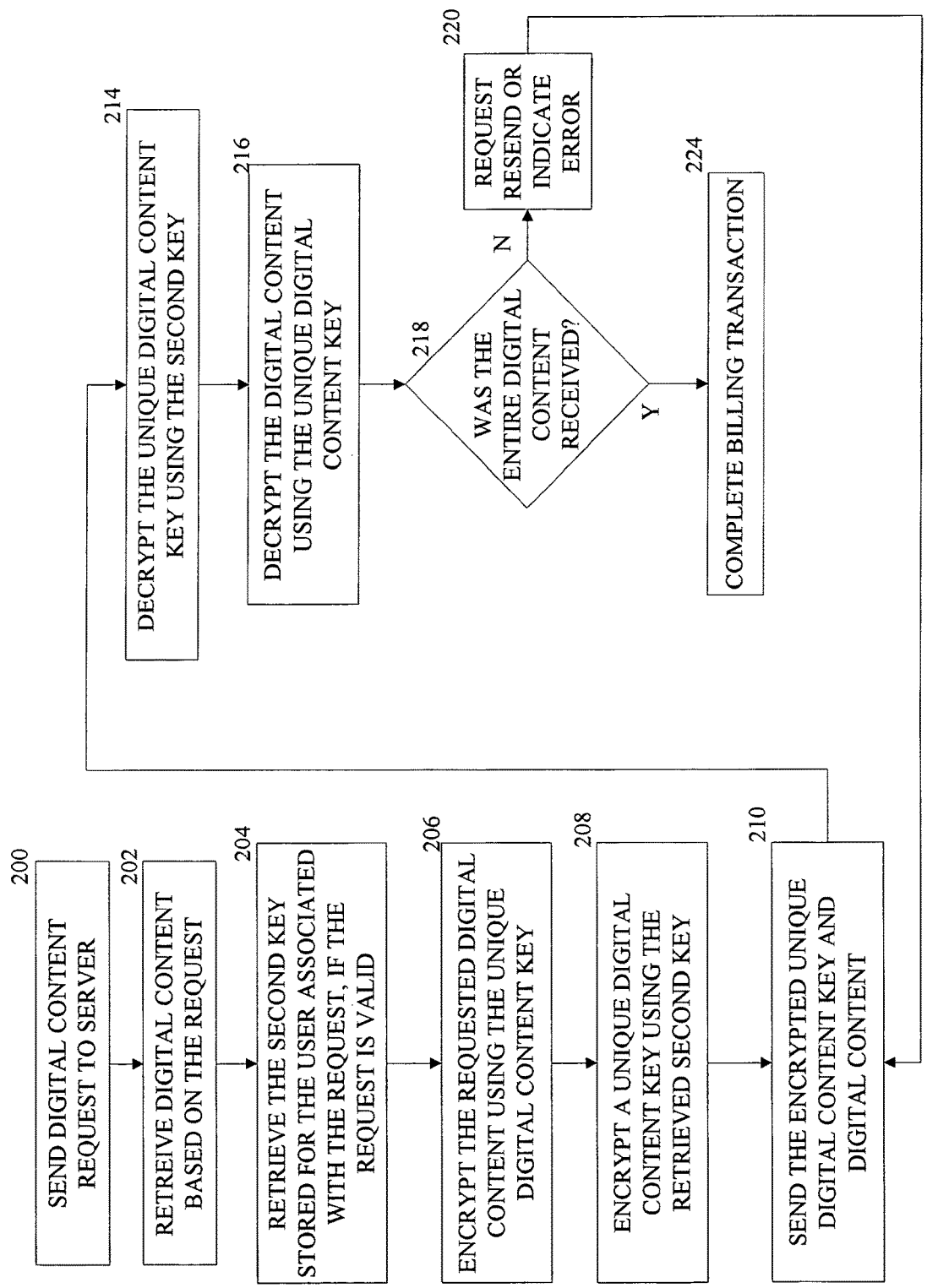
FIG. 3 illustrates a process for delivery of digital content performed by some of the components shown in FIG. 1.

As shown in FIG. 3, at a block 200, a user device 24 or 26 sends a request for digital content to the server 28. At a block 202, the server 28 retrieves the requested digital content. The server 28 may retrieve digital content from a local storage device or may retrieve it from the digital content provider/owners 42 or from some other source over the network 40. At a block 204, the server 28 retrieves the second key stored for the user associated with the request, if the request is valid. At a block 206, the server 28 encrypts the requested digital content using a unique digital content key. At a block 208, the server 28 encrypts the unique digital content key using the retrieved second key and, at a block 210, sends the encrypted unique digital content key and digital content to the user device that made the digital content request. At a block 214, the user device decrypts the unique digital content key using the previously stored second key. At a block 216, the user device decrypts the digital content using the unique digital content key. At a decision block 218, the user device determines if the entire digital content was received. If the entire digital content was not received, then at block 220, the user device requests that the server 28 resends and/or indicates an error. If the digital content was properly received, then at block 224 the server 28 completes a billing transaction. The steps of decrypting 214 and 216 may be performed when a user desires prentation of the digital content—after block 218 or 224.

Figure 4:
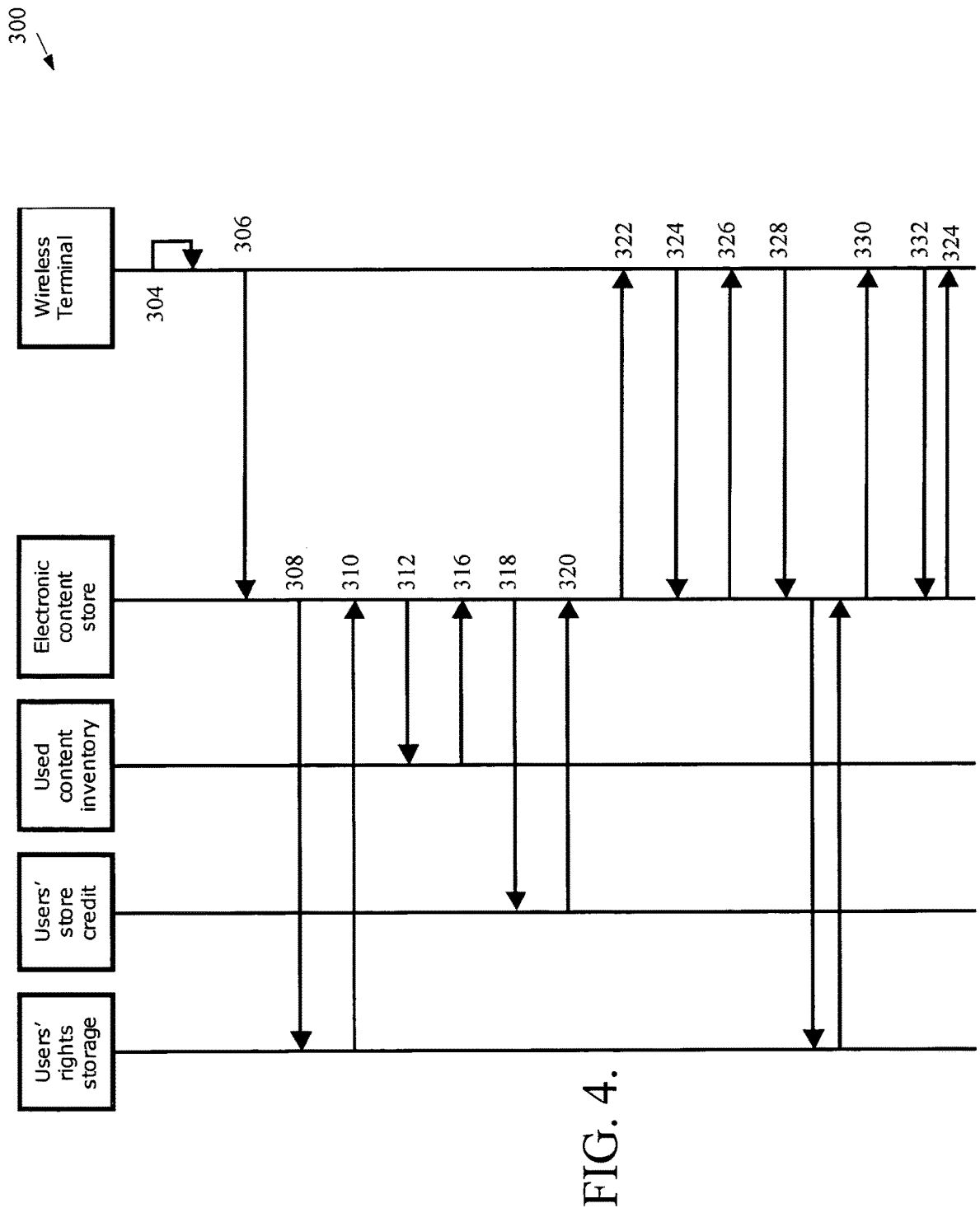
FIG. 4 illustrates a process for returning digital content in accordance with an embodiment of the present invention.

FIG. 4 illustrates an example process 300 performed in accordance with an embodiment of the present invention. First at 304, a user elects to return an item (digital content) to the store 48 on their wireless terminal (user device 24). In one embodiment, the item was originally purchased from the store 48, however, the item could have been purchased through other means, such as another user or another store. At 306, the store 48 receives the user's request via any network connection or a direct connection. At 308, the store commands the database (unit 52) to check for existence of the user's rights to the item and to delete if present. Rights information pertains to rights that the user has previously attained for the digital content. A confirmation of the deletion is returned to the store 48, at 310. If the store 48 maintains inventory of used items at the used content inventory storage unit 50, the inventory for that related used item is increased by 1, at 312. At 316, the inventory update is complete and the store 48 is notified of the completed process. At 318, the store 48 applies credit to an account balance associated to the user at the storage unit 52 and feedback is sent to the store 48, at 320. At 322, the store 48 resets the DRM client on the user device 24, invalidating all of the content keys stored on the phone. At 324, the DRM client proceeds with re-initialization cycle. At 326, re-initialization is complete, see FIG. 2. At 328, the user device 48 requests re-delivery of owned content keys. The owned content keys are digital content keys associated with the digital content that the user still has rights to use.

At 330, a current key set is created based on the updated information in the storage unit 52 and sent to the user device 24 for completion; similar to FIG. 3. A new second key is created, encrypted, sent, and decrypted in accordance with blocks 134-144, FIG. 2. Then, the unique or owned content keys are encrypted using the new second key, sent to the user device and decrypted using the new second key.

At 332, the user device 24 requests credit balance and at 334, the store 48 reports credit balance to the user.

In an alternate embodiment, when the user elects to return a digital content item, the user device deletes the unique content key associated with the elected digital content item.

Figure 5:
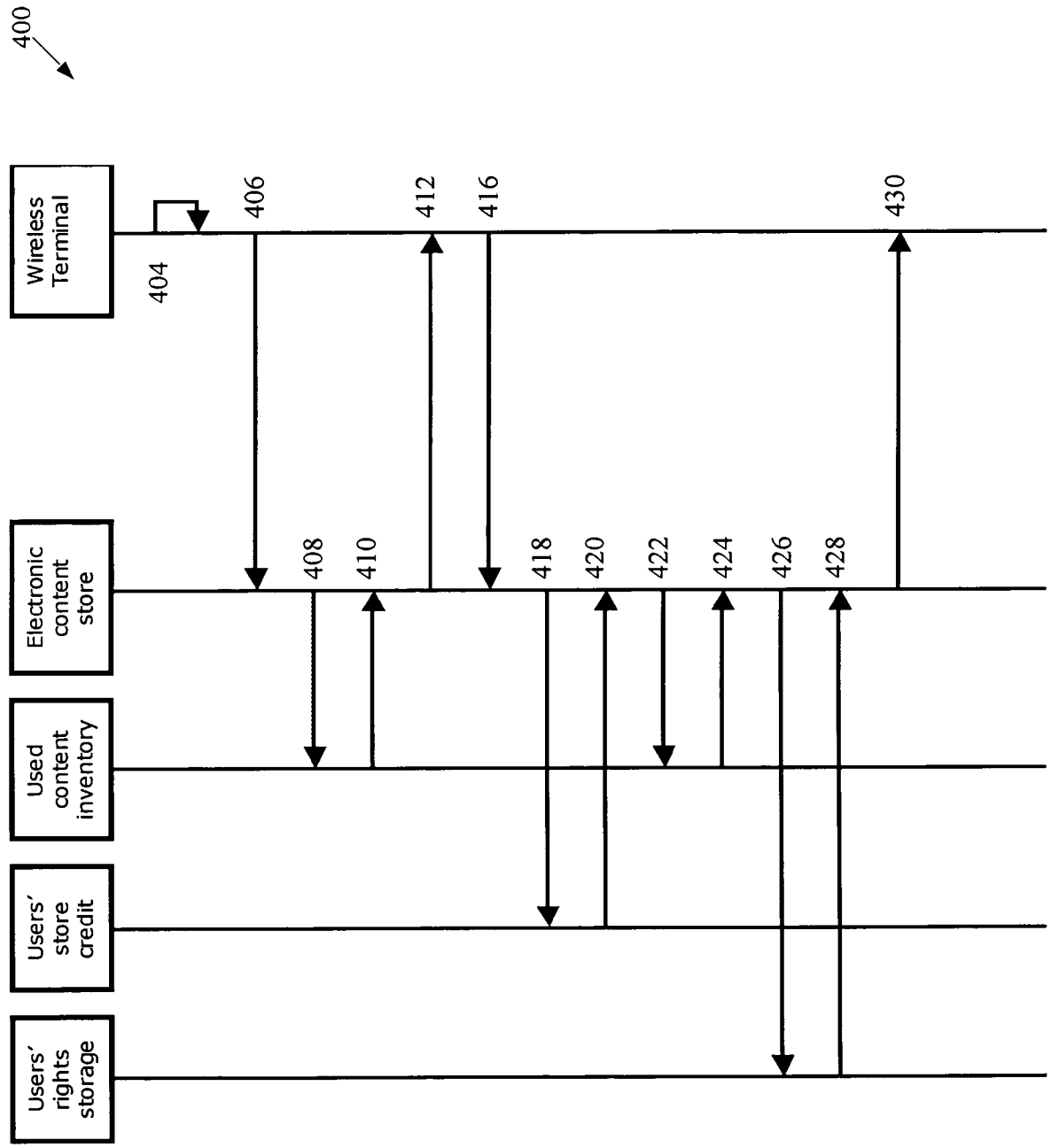
FIG. 5 illustrates an example process for purchasing of used digital content in accordance with an embodiment of the present invention.

FIG. 5 illustrates a process 400 for purchasing digital content identified as used content and stored in the used content inventory storage unit 50. At 404, a user browses the selection of available used content. At 406, the store 48 receives request to view available used inventory based on a signal send from the user device 24. At 408, the store 48 checks current inventory for the used content from the used content inventory storage unit 50 and results of the check are returned, at 410. At 412, the store 48 sends a menu of the currently stored inventory of used digital content and prices to the user device 24 for presentation to the user. At 416, a user selects one or more of the digital content items for purchase. At 418, the store 48 deducts credit from user's balance in the store 48. If insufficient balance, user will be billed by a separate mechanism, such as a previously designated credit card. At 420, results of payment method are returned to the store 48. At 422, 424, the store 48 subtracts one from the used content inventory for the just sold item. At 426, the store 48 commands a database (user's rights storage unit 52) to add the used item to the user's rights file. At 428, the store 238 receives confirmation of addition of the rights for the user. At 430, the purchased used content and content key are delivered to user device 24.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method comprising:
    sending, from a user device, an encrypted message comprising a user device identifier and a random number, encrypted with a first key, to a server via a first communication channel;
    sending, from the user device, the random number and the first key to the server via a second communication channel;
    receiving, at the user device, the random number and user device identifier encrypted with a second key by the server and the second key;
    decrypting, at the user device, the random number and user device identifier using the second key and saving the second key; and
    decrypting, at the user device, digital content using the stored second key.

2. The method of claim 1, further comprising:
    determining based on the decrypted digital content whether the received digital content is complete; and
    performing an incomplete content action if the digital content is not complete.

3. The method of claim 2, wherein the incomplete content action comprises requesting the server send the digital content.

4. The method of claim 2, wherein the incomplete content action comprises providing an error indication.

5. The method of claim 1, further comprising receiving, at the user device, digital content from the server.

6. The method of claim 1, wherein the second key is generated by the server if the random number from the encrypted message from the first communication channel matches the random number from the second communication channel.

7. A non-transitory computer-readable media comprising computer-executable instructions embodied thereon that, when executed by a processor, cause the processor to perform a process comprising:
    sending an encrypted message comprising a user device identifier and a random number, encrypted with a first key, to a server via a first communication channel;
    sending the random number and the first key to the server via a second communication channel;
    receiving the random number and user device identifier encrypted with a second key by the server and the second key;
    decrypting the random number and user device identifier using the second key and saving the second key; and
    decrypting digital content using the stored second key.

8. The non-transitory computer-readable media of The non-transitory computer-readable media of further comprising:
    determining based on the decrypted digital content whether the received digital content is complete; and
    performing an incomplete content action if the digital content is not complete.

9. The non-transitory computer-readable media of The non-transitory computer-readable media of wherein the incomplete content action comprises requesting the server send the digital content.

10. The non-transitory computer-readable media of The non-transitory computer-readable media of wherein the incomplete content action comprises providing an error indication.

11. The non-transitory computer-readable media of The non-transitory computer-readable media of further comprising receiving digital content from the server.

12. The non-transitory computer-readable media of The non-transitory computer-readable media of wherein the second key is generated by the server if the random number from the encrypted message from the first communication channel matches the random number from the second communication channel.

* * * * *